United States Patent
Tsuda et al.

(10) Patent No.: US 12,054,171 B2
(45) Date of Patent: Aug. 6, 2024

(54) WARNING CONTROL DEVICE AND WARNING CONTROL SYSTEM

(71) Applicant: ISUZU MOTORS LIMITED, Tokyo (JP)

(72) Inventors: Ryuta Tsuda, Fujisawa (JP); Kohei Takatoku, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/799,584

(22) PCT Filed: Feb. 15, 2021

(86) PCT No.: PCT/JP2021/005407
§ 371 (c)(1),
(2) Date: Aug. 12, 2022

(87) PCT Pub. No.: WO2021/166820
PCT Pub. Date: Aug. 26, 2021

(65) Prior Publication Data
US 2023/0078015 A1    Mar. 16, 2023

(30) Foreign Application Priority Data
Feb. 18, 2020    (JP) .................................. 2020-025117

(51) Int. Cl.
*B60Q 1/00*    (2006.01)
*B60W 40/08*    (2012.01)
(Continued)

(52) U.S. Cl.
CPC ............ *B60W 50/14* (2013.01); *B60W 40/08* (2013.01); *G06V 20/597* (2022.01);
(Continued)

(58) Field of Classification Search
CPC ................. B60W 50/14; B60W 40/08; B60W 2540/225; B60W 2540/229; B60W 2050/146; G06V 20/597
(Continued)

(56) References Cited

U.S. PATENT DOCUMENTS

| 5,801,667 A | 9/1998 | Shimizu et al. |
| 2014/0315531 A1* | 10/2014 | Joong ............... H04M 1/72463 455/26.1 |

(Continued)

FOREIGN PATENT DOCUMENTS

| CN | 110637211 A | 12/2019 |
| CN | 110799408 A | 2/2020 |

(Continued)

OTHER PUBLICATIONS

Patent Cooperation Treaty, International Search Report, Application No. PCT/JP2021/005407, dated Apr. 23, 2021, in 5 pages.

(Continued)

*Primary Examiner* — Naomi J Small
(74) *Attorney, Agent, or Firm* — PROCOPIO, CORY, HARGREAVES & SAVITCH LLP

(57) ABSTRACT

A warning control device includes a control device configured to identify a viewing direction of a driver based on a captured image including a face of the driver, detect, based on the viewing direction, distractedness that the driver views a direction different from a front side of a vehicle for a certain period of time or longer, in a case the distractedness of the driver is not detected, accept an operation on an operation member disposed inside the vehicle, and control a display to display an image based on the operation accepted, and in a case the distractedness of the driver is detected, and control the display to display a warning image for warning that the driver is not attentively viewing the front side.

8 Claims, 5 Drawing Sheets

(51) Int. Cl.
    *B60W 50/14*      (2020.01)
    *G06V 20/59*      (2022.01)
(52) U.S. Cl.
    CPC . *B60W 2050/146* (2013.01); *B60W 2540/225* (2020.02); *B60W 2540/229* (2020.02)
(58) Field of Classification Search
    USPC .......................................................... 340/438
    See application file for complete search history.

(56) References Cited

U.S. PATENT DOCUMENTS

| | | | | |
|---|---|---|---|---|
| 2016/0068103 | A1* | 3/2016 | McNew | ............ B60W 50/0097 701/23 |
| 2018/0135998 | A1* | 5/2018 | Paramasivam | ....... G06F 3/0227 |
| 2019/0052747 | A1* | 2/2019 | Breaux | ............ H04M 1/72454 |
| 2019/0092236 | A1 | 3/2019 | Hayashi | |
| 2020/0282979 | A1* | 9/2020 | Kim | ................. B60W 30/0956 |
| 2021/0023992 | A1* | 1/2021 | Broggi | ............... G02B 27/0101 |
| 2021/0155288 | A1 | 5/2021 | Takano | |

FOREIGN PATENT DOCUMENTS

| | | |
|---|---|---|
| JP | H07-325988 A | 12/1995 |
| JP | 2000-322699 A | 11/2000 |
| JP | 2007-304712 A | 11/2007 |
| JP | 2011-164712 A | 8/2011 |
| JP | 2017-211818 A | 11/2017 |
| JP | 2019-064460 A | 4/2019 |
| WO | 2020-031873 A1 | 2/2020 |

OTHER PUBLICATIONS

Patent Cooperation Treaty, WOSA, Application No. PCT/JP2021/005407, dated Apr. 23, 2021, in 3 pages.
National Intellectual Property Administration, Notification of the Chinese First Office Action, Application No. 202180015412.0, on May 31, 2023, in 27 pages.

* cited by examiner

WARNING CONTROL DEVICE AND WARNING CONTROL SYSTEM

CROSS-REFERENCE TO RELATED APPLICATIONS

This application is US National Stage of International Patent Application PCT/JP2021/005407, filed Feb. 15, 2021, which claims benefit of priority from Japanese Patent Application JP2020-025117, filed Feb. 18, 2020, the contents of both of which are incorporated herein by reference.

TECHNICAL FIELD

The present disclosure relates to a warning control device and a warning control system that display a warning image.

BACKGROUND ART

A technique of detecting distractedness of a driver and displaying a warning is known (for example, Patent Literature 1).

CITATION LIST

Patent Literature

Patent Literature 1: JP H07-325988 A

SUMMARY OF INVENTION

Technical Problem

During driving, a driver may view a display unit such as a display and perform various operations, and does not view a front side of a vehicle. In the invention described in Patent Literature 1, a warning is displayed on a display unit when a driver views the display unit during driving. However, even if the warning is displayed on the display unit, the driver may view the display unit and continuously perform the operation.

The present disclosure has been made in view of this point, and an object thereof is to provide a warning control device capable of preventing a driver from continuing an operation even though a warning is displayed in a case where the driver views a display unit during driving and performs various operations.

Solution to Problem

According to a first illustrative aspect of the present disclosure, a warning control device includes: an identification unit configured to identify a viewing direction of a driver based on a captured image including a face of the driver; a distractedness detection unit configured to detect, based on the viewing direction identified by the identification unit, distractedness that the driver views a direction different from a front side of a vehicle for a certain period of time or longer; an operation accepting unit configured to: accept an operation on an operation member disposed inside the vehicle in a case distractedness of the driver is not detected by the distractedness detection unit; and restrict the operation on the operation member in a case distractedness of the driver is detected by the distractedness detection unit; and a display control unit configured to: display an image based on the operation accepted by the operation accepting unit in the case distractedness of the driver is not detected by the distractedness detection unit; and display a warning image for warning that the driver is not attentively viewing the front side in the case distractedness of the driver is detected by the distractedness detection unit.

The display control unit may be configured to, in the case distractedness of the driver is detected by the distractedness detection unit, display the warning image instead of the image based on the operation. The display control unit may be configured to, in the case distractedness of the driver is detected by the distractedness detection unit, select any one of a plurality of the warning images for display based on the viewing direction of the driver identified by the identification unit.

The display control unit may be configured to, in a case the viewing direction identified by the identification unit is a direction of a display unit for displaying the image based on the operation, select and display the warning image for warning that the driver is viewing the display unit. The distractedness detection unit may be configured to detect distractedness of the driver on condition that a speed of the vehicle is equal to or higher than a predetermined value.

The warning control device may further include a storage unit configured to store a history of a driving situation of the driver, and the distractedness detection unit may store information indicating that distractedness of the driver is detected in the storage unit as the history of the driving situation. The display control unit may be configured to, in a case an operation is performed on the operation member in a state where the warning image is being displayed, display a notification image indicating that the operation is restricted.

According to a second illustrative aspect of the present disclosure, a warning control system includes: a display unit; an image capturing unit disposed inside a vehicle and configured to capture an image of a predetermined range including a face of a driver; an operation member disposed inside the vehicle; and a control device, wherein the control device is configured to: identify a viewing direction of the driver based on a captured image including the face of the driver which is captured by the image capturing unit; detect, based on the identified viewing direction, distractedness that the driver views a direction different from a front side of the vehicle for a certain period of time or longer; in a case distractedness of the driver is not detected, accept an operation on the operation member; and display an image based on the accepted operation on the display unit; and in a case distractedness of the driver is detected, restrict the operation on the operation member; and display a warning image for warning that the driver is not attentively viewing a front side on the display unit.

Advantageous Effects of Invention

According to the present disclosure, a driver can be prevented from continuing an operation even though a warning is displayed in a case where the driver views a display unit during driving and performs various operations.

DESCRIPTION OF EMBODIMENTS

<Outline of Warning Control Device>

Figure 1:
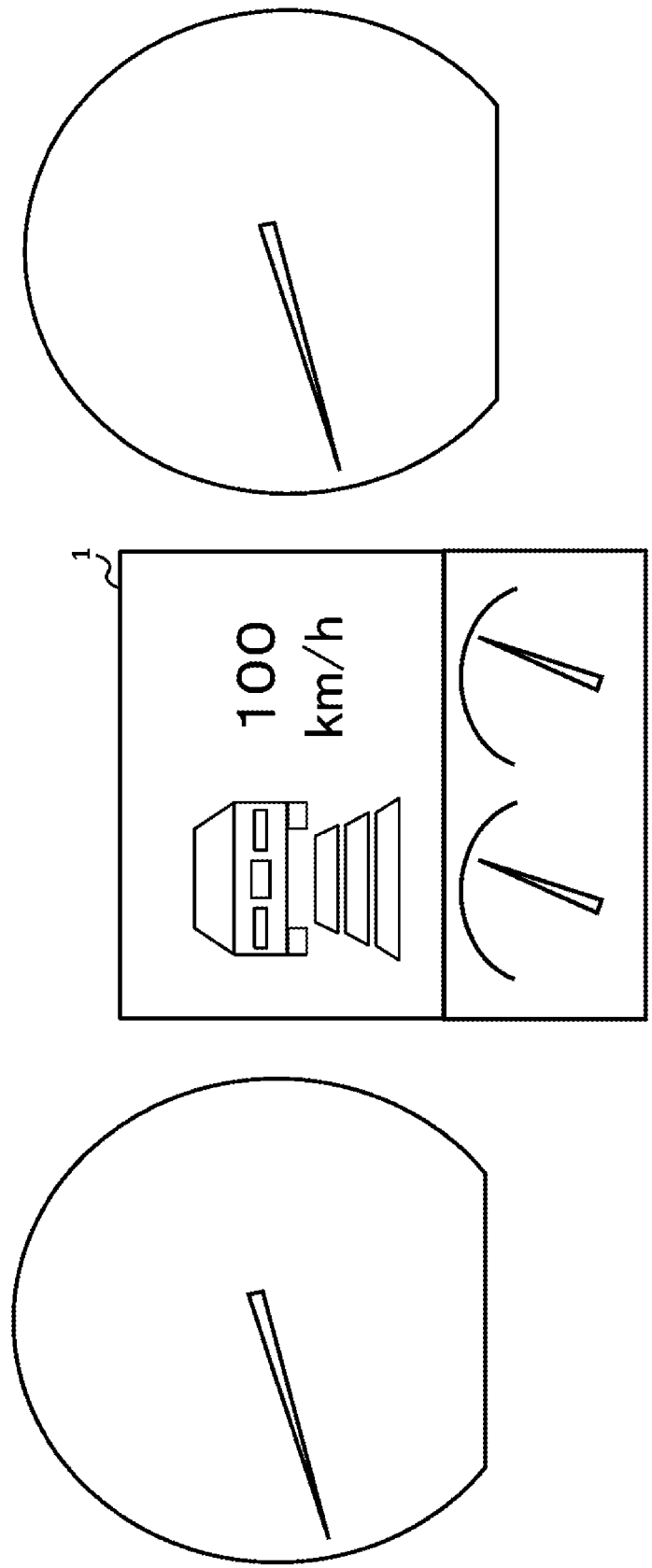
FIG. 1 is a diagram showing an outline of a warning control device according to an embodiment.

FIG. 1 is a diagram showing an outline of a warning control device according to an embodiment. A display unit 1 is disposed as a part of a meter on an instrumental panel of a vehicle on which the warning control device is mounted. The display unit 1 displays, for example, an image based on an operation of a driver. A setting image for setting a set vehicle speed and an inter-vehicle distance in adaptive cruise control is displayed on the display unit 1 shown in FIG. 1. The number of trapezoidal marks arranged below a vehicle mark shown on the left side of the setting image indicates the inter-vehicle distance in stages. In the present embodiment, the inter-vehicle distance can be set in four stages, and the number of marks corresponds to the number of stages. In the example of FIG. 1, the number of trapezoidal marks is three, which indicates that the inter-vehicle distance is set to the third from a shorter one among the four stages. On the right side of the setting image, the set vehicle speed is shown. In the example of FIG. 1, the set vehicle speed is 100 km/h.

An image capturing unit disposed inside the vehicle generates a captured image including the face of the driver. The warning control device identifies a viewing direction of the driver by analyzing the captured image generated by the image capturing unit. The warning control device detects distractedness of the driver based on the identified viewing direction. The distractedness refers to viewing a direction different from a front side of the vehicle for a certain period of time or longer. When distractedness of the driver is not detected, the warning control device accepts an operation on an operation member such as a switching button disposed inside the vehicle.

Figure 2:
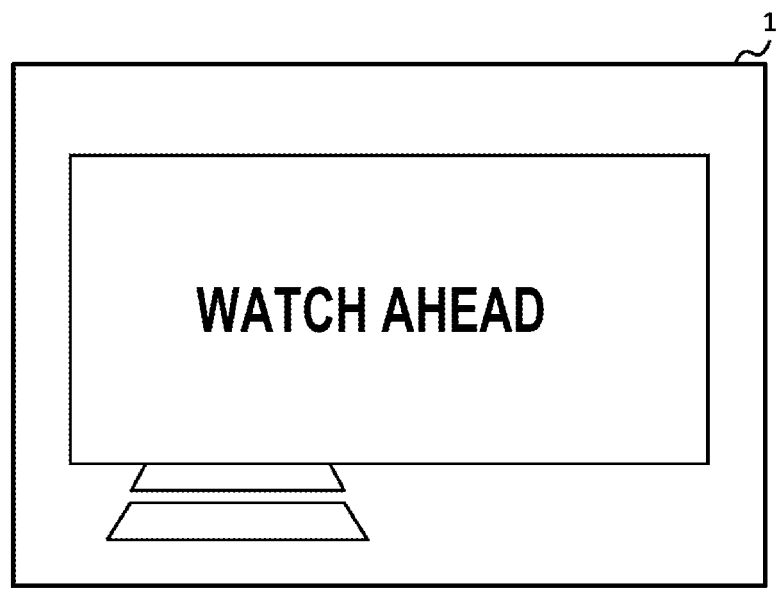
FIG. 2 is a diagram showing an example of display control by the warning control device.

FIG. 2 is a diagram showing an example of display control by the warning control device. When distractedness of the driver is detected in a state where the setting image shown in FIG. 1 is displayed, the warning control device displays a warning image for warning that the driver is not attentively viewing the front side on the display unit 1. In the example of FIG. 2, the warning control device causes the display unit 1 to display a message "watch ahead". The warning image is displayed so as to cover the setting image shown in FIG. 1, and a part of the setting image not covered with the warning image is continuously displayed.

In addition, the warning control device restricts an operation on an operation member in a case where distractedness of the driver is detected. The warning control device restricts the operation on the operation member by the driver when the driver views the setting image and operates the operation member during driving in a case where distractedness of the driver is detected. In this manner, when the warning image is displayed, the warning control device can prevent the driver from continuously operating the operation member.

<Configuration of Vehicle>

Figure 3:
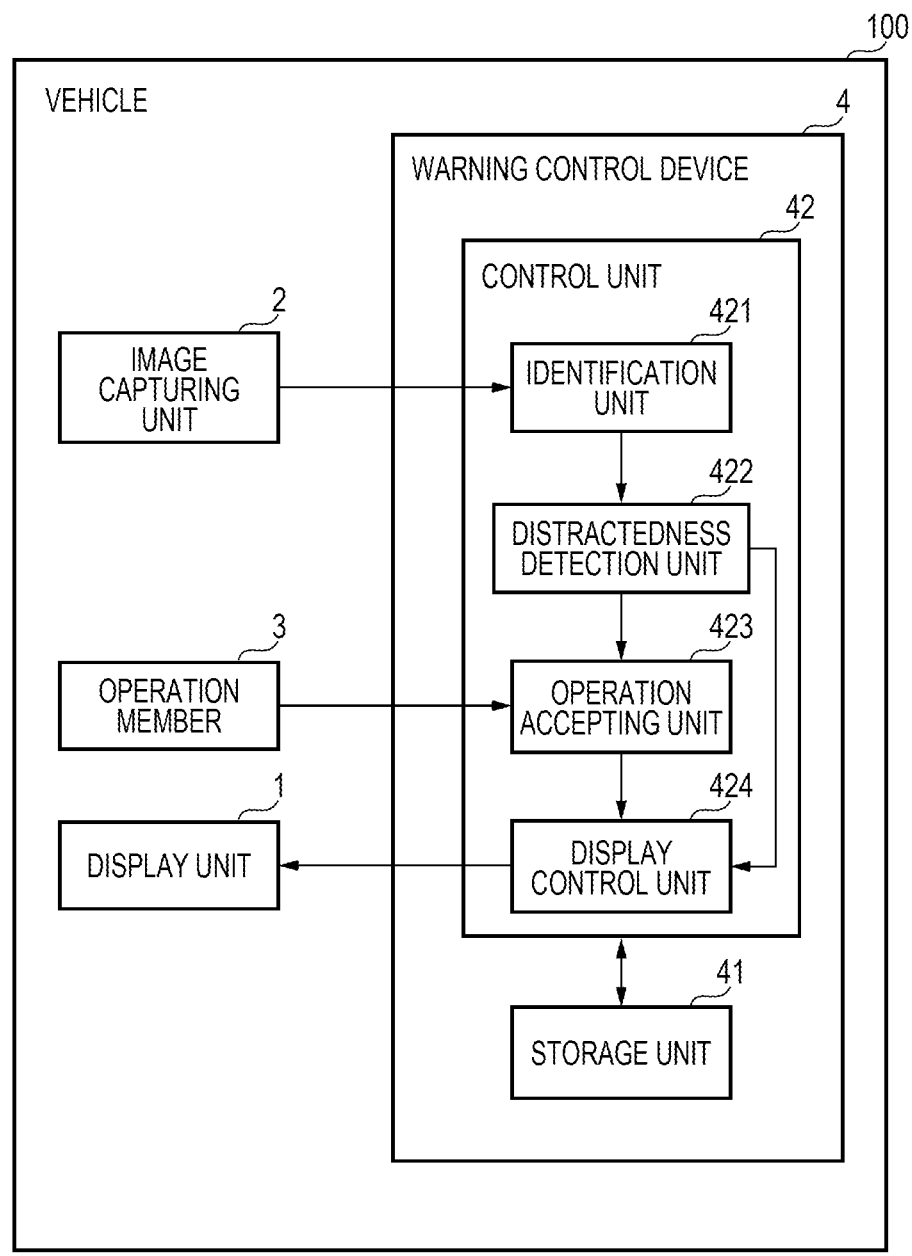
FIG. 3 is a diagram showing a configuration of a vehicle.

FIG. 3 is a diagram illustrating a configuration of a vehicle 100. The vehicle 100 includes the display unit 1, an image capturing unit 2, an operation member 3, and a warning control device 4. The warning control device 4 is implemented by, for example, an electronic control unit (ECU). The warning control device 4 includes a storage unit 41 and a control unit 42.

The image capturing unit 2 is provided inside the vehicle 100. The image capturing unit 2 generates a captured image including the face of the driver by capturing an image of a predetermined range including the face of the driver. The predetermined range is, for example, the upper body of the driver. The operation member 3 is disposed inside the vehicle 100. The operation member 3 is, for example, a pair of switching buttons disposed on a steering wheel of the vehicle 100. In addition, the operation member 3 may be a lever for performing a slide operation, or may be a touch sensor type operation button displayed on the display unit 1.

The storage unit 41 includes, for example, a read only memory (ROM), a random access memory (RAM), and the like. The storage unit 41 stores various programs and various data for causing the control unit 42 to function. By executing the programs stored in the storage unit 41, the control unit 42 functions as an identification unit 421, a distractedness detection unit 422, an operation accepting unit 423, and a display control unit 424.

The identification unit 421 obtains the captured image generated by the image capturing unit 2. The identification unit 421 identifies a viewing direction of the driver based on the obtained captured image. As an example, the identification unit 421 identifies a position of the pupil of the driver and a position where corneal reflection occurs by analyzing the obtained captured image. The identification unit 421 identifies the viewing direction of the driver by identifying a relative position of the pupil with reference to the position where the corneal reflection occurs.

<Detection of Distractedness>

The distractedness detection unit 422 detects distractedness, which is a state in which the driver views a direction different from a front side of the vehicle for a certain period of time or longer, based on the viewing direction identified by the identification unit 421. The direction different from the front side is, for example, a direction of the display unit 1, a direction of a display of a car navigation system mounted on the vehicle 100, a direction of various mirrors mounted on the vehicle 100, a right side or a left side of the vehicle 100, or a rear side of the vehicle 100. The certain period of time is, for example, a period of time longer than a period of time during which the driver views a region other than the front side of the vehicle in various operations necessary for driving the vehicle 100, such as checking a speed of the vehicle 100 by a speed meter. The distractedness detection unit 422 detects, as the distractedness, a case where a total time during which the driver views a plurality of directions different from the front side is equal to or longer than a certain period of time.

Since traveling of the vehicle 100 on an expressway is particularly dangerous, it is highly important to prevent distractedness. Therefore, the distractedness detection unit 422 detects distractedness of the driver on condition that the speed of the vehicle 100 is equal to or higher than a predetermined value. The predetermined value is, for example, a value larger than the legal minimum speed of the expressway. In this manner, the distractedness detection unit 422 detects distractedness of the driver only while the vehicle 100 is traveling on an expressway, so as to ensure safety in traveling of the vehicle 100 on the expressway.

The distractedness detection unit 422 stores information indicating that distractedness of the driver is detected in the storage unit 41 as a history of driving situation. For example, the distractedness detection unit 422 stores the viewing direction identified by the identification unit 421, a period of time during which the driver views a region other than the front side, and a time point at which distractedness is detected in the storage unit 41 in association with each other as the history of the driving situation. The distractedness detection unit 422 may communicate with a management server (not shown) for managing operation of the vehicle 100 via a wireless communication line, and transmit the history of the driving situation stored in the storage unit 41 to the management server. For example, an administrator of the management server can effectively utilize the history of the driving situation in the driving safety guidance for the driver.

When the distractedness of the driver is not detected by the distractedness detection unit 422, the operation accepting unit 423 accept an operation performed on the operation member 3 by the driver. When the distractedness of the driver is detected by the distractedness detection unit 422, the operation accepting unit 423 restricts an operation on the operation member 3. For example, it is assumed that the setting image displayed when the inter-vehicle distance and the set vehicle speed of the adaptive cruise control are set is displayed immediately before the distractedness detection unit 422 detects distractedness of the driver. After the distractedness of the driver is detected by the distractedness detection unit 422, the operation accepting unit 423 does not accept an operation performed by the driver to set the inter-vehicle distance and the set vehicle speed.

After the distractedness of the driver is detected by the distractedness detection unit 422, the operation accepting unit 423 restricts the operation on the operation member 3 by the driver for a predetermined period of time. The predetermined period of time is a time for enabling the driver to recognize that the operation is restricted. Even if the distractedness of the driver is detected by the distractedness detection unit 422 during a grace period after the predetermined period of time has elapsed, the operation accepting unit 423 accepts an operation of the driver. The grace period is, for example, a time set in advance by the driver. When the distractedness of the driver is detected by the distractedness detection unit 422 after the elapse of the grace period, the operation accepting unit 423 restricts an operation on the operation member 3 again.

The display control unit 424 performs display control of the display unit 1. When the distractedness of the driver is not detected by the distractedness detection unit 422, the display control unit 424 displays an image based on the operation accepted by the operation accepting unit 423. For example, the display control unit 424 displays a setting image that is displayed when setting the set vehicle speed and the inter-vehicle distance of the adaptive cruise control, an image that displays oil pressure of engine oil, and the like.

The display control unit 424 displays an image based on the operation accepted by the operation accepting unit 423 when the operation accepting unit 423 accepts the operation on the operation member 3 in a state where the image is displayed. For example, when the operation accepting unit 423 receives an operation of increasing or decreasing the set vehicle speed in a state where the setting image shown in FIG. 1 is displayed, the display control unit 424 displays the changed set vehicle speed on the display unit 1.

When the distractedness of the driver is detected by the distractedness detection unit 422, the display control unit 424 displays a warning image for warning that the driver is not attentively viewing the front side. In this case, as shown in FIG. 2, the display control unit 424 displays the warning image instead of the image based on the operation. The display control unit 424 displays the warning image until the predetermined period of time elapses. Even if the distractedness of the driver is detected by the distractedness detection unit 422 during a grace period after the predetermined period of time has elapsed, the display control unit 424 does not display the warning image and displays again the setting image displayed on the display unit 1 before the warning image is displayed. When the distractedness of the driver is detected by the distractedness detection unit 422 after the elapse of the grace period, the display control unit 424 displays the warning image again.

In a state where the warning image is displayed, even if the operation member 3 is operated, the display control unit 424 does not display the setting image displayed on the display unit 1 before the warning image is displayed, and displays the warning image as it is. Further, the display control unit 424 may display a notification image indicating that an operation is restricted when an operation is performed on the operation member 3 in a state where the warning image is displayed.

Figure 4:
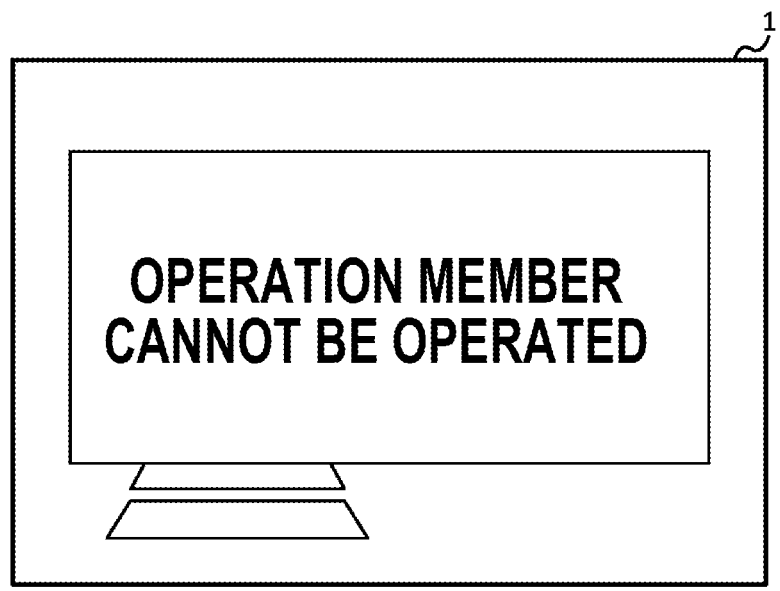
FIG. 4 is a diagram showing an example of a notification image.

FIG. 4 is a diagram showing an example of the notification image. For example, the display control unit 424 displays the notification image when an operation is performed on the operation member 3 in a state where the warning image shown in FIG. 2 is displayed. In the example of FIG. 4, the display control unit 424 displays the notification image including a message "operation member cannot be operated". In this manner, the display control unit 424 can notify the driver that the operation on the operation member 3 is restricted, and can cause the driver to stop the operation on the operation member 3.

<Select Warning Image>

The display control unit 424 may select any one of a plurality of warning images. When the distractedness of the driver is detected by the distractedness detection unit 422, the display control unit 424 obtains the viewing direction of the driver identified by the identification unit 421. The display control unit 424 selects one of the warning images based on the obtained viewing direction. For example, when the viewing direction is a direction of the display unit 1, the display control unit 424 selects a warning image for warning that the driver is viewing the display unit 1.

On the other hand, when the viewing direction is a direction of a display of a car navigation system, the display control unit 424 selects a warning image for warning that the driver is viewing the display of the car navigation system. The display control unit 424 displays the selected warning image on the display unit 1. In this way, the display control unit 424 can display the warning image corresponding to the driving situation of the driver.

In addition, the display control unit 424 may select the warning image based on whether or not the operation member 3 is being operated. For example, the display control unit 424 may select a warning image for warning that the driver is viewing the display unit 1 on condition that the viewing direction is the direction of the display unit 1 and the operation member 3 is being operated. In this way, the display control unit 424 can accurately identify that the driver is operating the operation member 3 while viewing the display unit 1.

<Processing Procedure of Displaying Warning Image>

Figure 5:
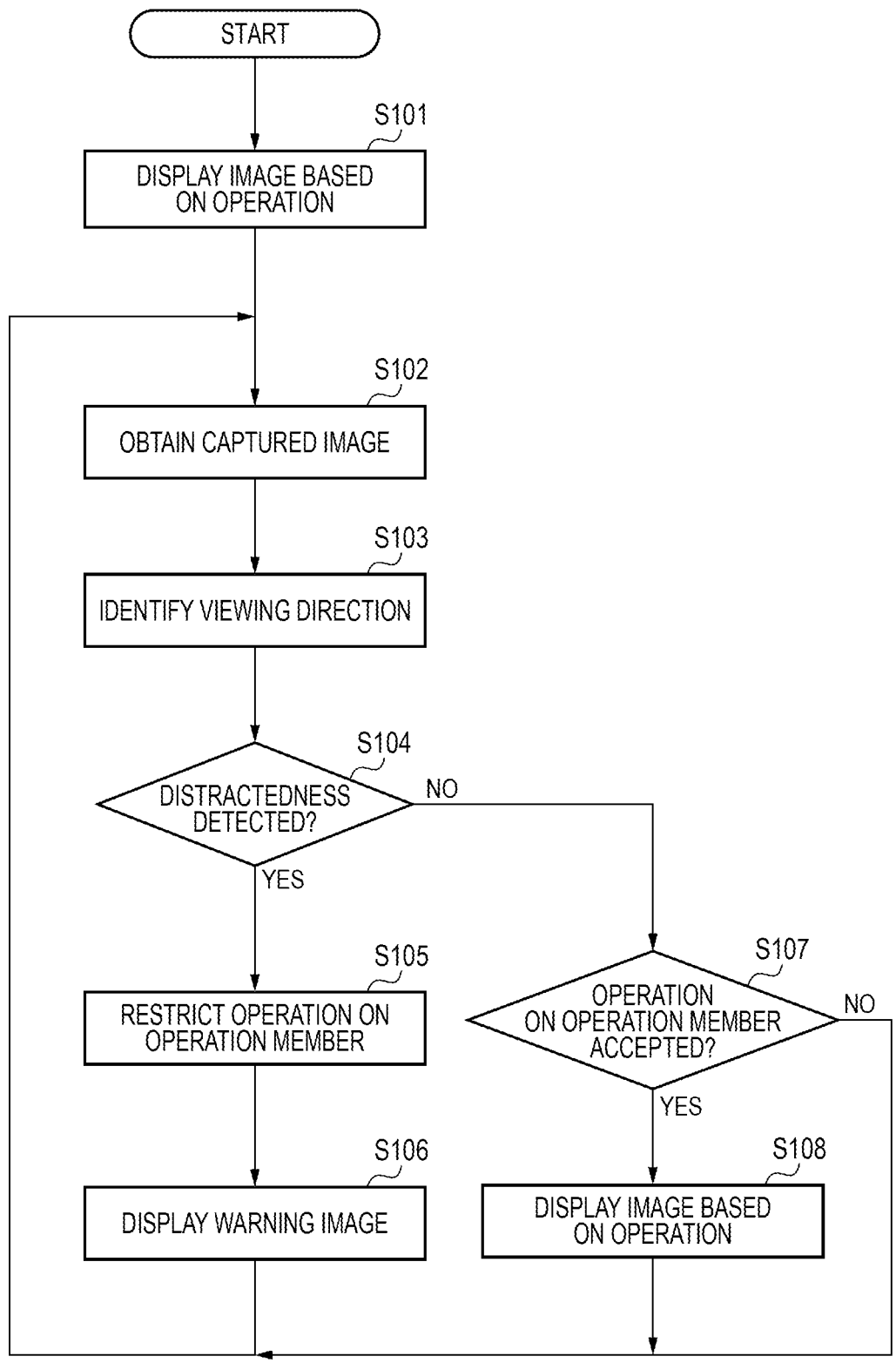
FIG. 5 is a flowchart showing a processing procedure of displaying a warning by the warning control device.

FIG. 5 is a flowchart showing a processing procedure of displaying a warning by the warning control device 4. The processing procedure is started, for example, when the operation accepting unit 423 accepts an operation on the operation member 3 while the vehicle 100 is traveling. First, the display control unit 424 displays an image based on the operation accepted by the operation accepting unit 423 (S101).

The image capturing unit 2 generates a captured image including the face of the driver. The identification unit 421 obtains the captured image generated by the image capturing unit 2 (S102). The identification unit 421 identifies a viewing direction of the driver based on the obtained captured image (S103). The operation accepting unit 423 determines whether distractedness of the driver is detected by the distractedness detection unit 422 (S104). When the distractedness of the driver is detected by the distractedness detection unit 422 (YES in S104), the operation accepting unit 423 restricts an operation on the operation member 3 (S105). The display control unit 424 displays a warning image for warning that the user is not attentively viewing the front side (S106) and returns to the process of S102.

When the distractedness of the driver is not detected by the distractedness detection unit 422 in the determination of S104 (NO in S104), the display control unit 424 determines whether the operation accepting unit 423 has further accepted an operation on the operation member 3 (S107). When the operation accepting unit 423 further accepts an operation on the operation member 3 (YES in S107), the display control unit 424 displays an image based on the operation (S108), and returns to the process of S102. When the operation accepting unit 423 does not accept an operation on the operation member 3 in the determination of S107 (NO in S107), the display control unit 424 returns to the process of S102.

Effects

According to the present embodiment, the display control unit 424 displays the warning image on the display unit 1 when the driver views the display unit 1 and operates the operation member 3 during driving. At this time, the operation accepting unit 423 restricts the operation on the operation member 3. In this manner, when the display control unit 424 displays the warning image, the operation accepting unit 423 can prevent the driver from continuously operating the operation member 3.

The present invention has been described using the embodiment, but the technical scope of the present invention is not limited to the scope described in the embodiment described above, and various modifications and changes can be made within the scope thereof. For example, all or some of the devices may be functionally or physically distributed or integrated in any unit. Further, new embodiments generated by any combination of a plurality of embodiments are also contained in the embodiment of the present invention. Effects of the new embodiment generated by the combination include effects of the original embodiment.

The present application is based on the Japanese Patent Application No. 2020-25117 filed on Feb. 18, 2020, and contents thereof are incorporated herein as reference.

INDUSTRIAL APPLICABILITY

The present invention has an effect of preventing a driver from continuing an operation even though a warning is displayed in a case where the driver views a display unit during driving and performs various operations, and is useful for a warning control device, a warning control system, and the like.

REFERENCE SIGNS LIST

1 Display unit
2 Image capturing unit
3 Operation member
4 Warning control device
41 Storage unit
42 Control unit
100 Vehicle
421 Identification unit
422 Distractedness detection unit
423 Operation accepting unit
424 Display control unit

The invention claimed is:

1. A warning control device comprising:
a control device configured to:
identify a viewing direction of a driver based on a captured image including a face of the driver;
detect, based on the viewing direction, distractedness that the driver views a direction different from a front side of a vehicle for a certain period of time or longer;
in a case the distractedness of the driver is not detected:
accept an operation on an operation member disposed inside the vehicle; and
control a display to display an image based on the operation accepted; and
in a case the distractedness of the driver is detected:
restrict the operation on the operation member; and
control the display to display a warning image for warning that the driver is not attentively viewing the front side,
wherein, in the case the distractedness of the driver is detected, the control device is configured to:
in the restricting of the operation:
restrict the operation on the operation member for a predetermined period of time;
during a grace period after the predetermined period of time has elapsed, accept the operation of the driver regardless of whether the distractedness of the driver is detected; and
after the grace period elapses, in the case the distractedness of the driver is detected, restrict the operation again; and
in the controlling of the display:
control the display to display the warning image until the predetermined period time elapses; and
during the grace period after the predetermined period of time has elapsed, control the display not to display the warning image regardless of whether the distractedness of the driver is detected.

2. The warning control device according to claim 1, wherein in the controlling of the display, the control device is configured to, in the case the distractedness of the driver is detected, control the display to display the warning image instead of the image of the image based on the operation.

3. The warning control device according to claim 1, wherein in the controlling of the display, the control device is configured to, in the case the distractedness of the driver is detected, select any one of a plurality of the warning images for display based on the identified viewing direction of the driver.

4. The warning control device according to claim 3, wherein in the controlling of the display, the control device is configured to, in the case the identified viewing direction is a direction of a display for displaying the image based on the operation, select the warning image for warning that the driver is viewing the display and control the display to display the selected warning image.

5. The warning control device according to claim 1, wherein in the detecting, the control device is configured to detect the distractedness of the driver on condition that a speed of the vehicle is equal to or higher than a predetermined value.

6. The warning control device according to claim 1, further comprising:
   a memory,
   wherein in the detecting, the control device is configured to store information indicating that the distractedness of the driver is detected in the memory as a history of a driving situation of the driver.

7. The warning control device according to claim 1, wherein in the controlling of the display, the control device is configured to, in a case an operation is performed on the operation member in a state where the warning image is being displayed, control the display to display a notification image indicating that the operation is restricted.

8. A warning control system comprising:
   a display;
   an image capture device disposed inside a vehicle and configured to capture an image of a predetermined range including a face of a driver;
   an operation member disposed inside the vehicle; and
   a control device configured to:
      identify a viewing direction of the driver based on a captured image including the face of the driver which is captured by the image capture device;
      detect, based on the identified viewing direction, distractedness that the driver views a direction different from a front side of the vehicle for a certain period of time or longer;
   in a case the distractedness of the driver is not detected:
      accept an operation on the operation member; and
      display an image based on the accepted operation on the display; and
   in a case the distractedness of the driver is detected:
      restrict the operation on the operation member; and
   display a warning image for warning that the driver is not attentively viewing a front side on the display,
   wherein, in the case the distractedness of the driver is detected, the control device is configured to:
   in the restricting of the operation:
      restrict the operation on the operation member for a predetermined period of time;
      during a grace period after the predetermined period of time has elapsed, accept the operation of the driver regardless of whether the distractedness of the driver is detected; and
      after the grace period elapses, in the case the distractedness of the driver is detected, restrict the operation again; and
   in the displaying:
      display the warning image until the predetermined period time elapses; and
      during the grace period after the predetermined period of time has elapsed, not to display the warning image regardless of whether the distractedness of the driver is detected.

* * * * *